United States Patent
Yonezawa et al.

(10) Patent No.: US 6,470,743 B2
(45) Date of Patent: Oct. 29, 2002

(54) HEAT-SENSITIVE FLOW RATE SENSOR

(75) Inventors: Fumiyoshi Yonezawa, Tokyo (JP); Hiroyuki Uramachi, Tokyo (JP); Shingo Hamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/847,582

(22) Filed: May 3, 2001

(65) Prior Publication Data

US 2002/0050165 A1 May 2, 2002

(30) Foreign Application Priority Data

Oct. 31, 2000 (JP) ........................................ 2000-332348

(51) Int. Cl.$^7$ ................................................. G01F 1/68
(52) U.S. Cl. ................................................. 73/204.26
(58) Field of Search ........................ 73/204.26, 204.23, 73/204.25, 204.24, 204.22

(56) References Cited

U.S. PATENT DOCUMENTS

| | | | |
|---|---|---|---|
| 4,912,975 A | * | 4/1990 | Ohta et al. ................ 73/204.26 |
| 5,313,832 A | * | 5/1994 | Stephan et al. ........... 73/204.26 |
| 5,396,795 A | * | 3/1995 | Araki ...................... 73/204.26 |
| 5,723,784 A | * | 3/1998 | Lembke et al. ........... 73/204.26 |
| 5,744,713 A | * | 4/1998 | Wienand et al. .......... 73/204.26 |

FOREIGN PATENT DOCUMENTS

| | | | |
|---|---|---|---|
| JP | 4-2967 | 1/1992 | ............. G01P/5/12 |
| JP | 9-26343 | 1/1997 | ............. G01F/1/68 |
| JP | 10-142020 | 5/1998 | ............. G01F/1/68 |
| JP | 2000-2573 | 1/2000 | ............. G01F/1/68 |

* cited by examiner

Primary Examiner—Benjamin R. Fuller
Assistant Examiner—Jewel V. Thompson
(74) Attorney, Agent, or Firm—Sughrue Mion, PLLC (57) ABSTRACT

A heat-sensitive flow rate sensor that is high in productivity, superior in accuracy of flow rate measurement and sensitivity. A bottom face of a concave accommodating portion 18 of an supporting member 16 is provided with an adhesion face 24 for fastening a flow rate-detecting element 14 thereon with an adhesive 15, installation faces 25a, 25b for holding the flow rate-detecting element 14 thereon, and a protruding face 26 for blocking in a raised manner the whole area of a cavity 13 on the underside of the flow rate-detecting element 14. As a result of employing this construction, even when increasing an intake fluid to a large amount of flow, the protruding face 26 blocks the vicinity of the cavity 13. Therefore, the fluid to be measured hardly flows into the gap between the underside of the flow rate-detecting element 14 and the supporting member 16. Consequently, accuracy in flow rate measurement is improved. Furthermore, the protruding face 26 is formed slightly larger than the area of the cavity 13 in the flow rate-detecting element 14, thereby preventing an underflow. As a result, assembling the flow rate-detecting element 14 becomes easier, which is suitable for large-scale production.

7 Claims, 10 Drawing Sheets

PRIOR ART

HEAT-SENSITIVE FLOW RATE SENSOR

BACKGROUND OF THE INVENTION

1. Technical Field

The present invention relates to a heat-sensitive flow rate sensor for measuring flow rate such as amount of intake air of an internal combustion engine. More particularly, the invention relates to an improved heat-sensitive flow rate sensor for measuring velocity or flow rate of a fluid to be measured on the basis of heat transfer phenomenon caused by a heating element or a part heated by the heating element.

2. BACKGROUND ART

Figure 16:
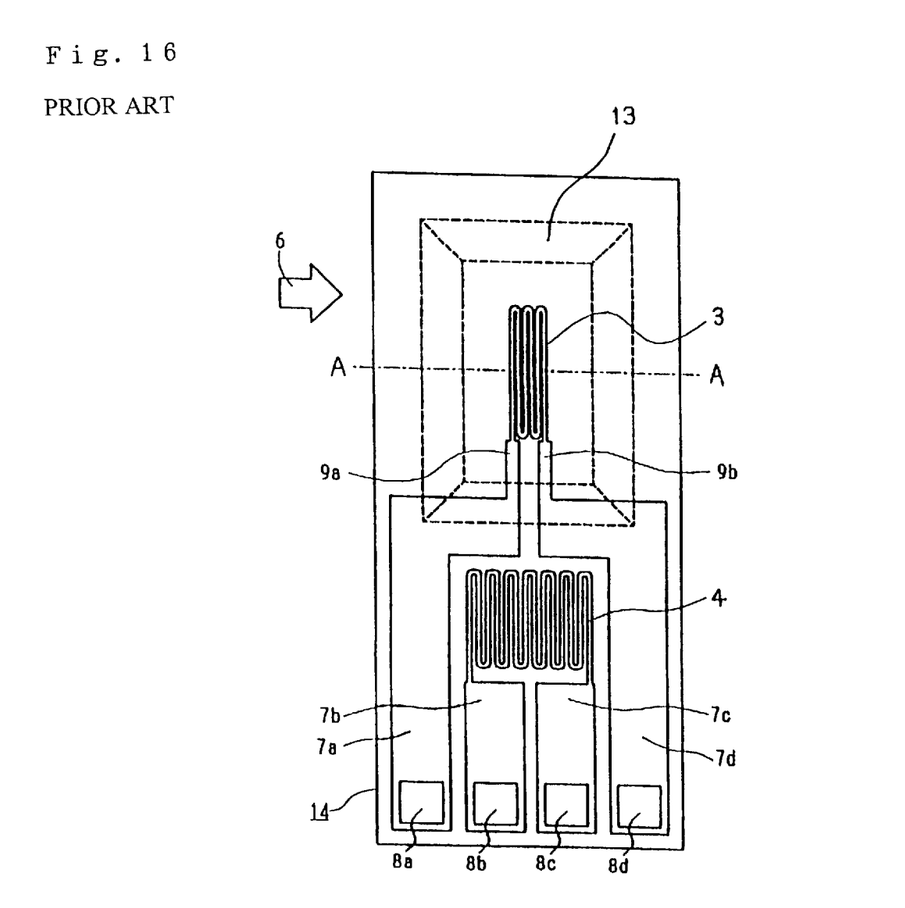
FIG. 16 is a plan view showing a heat-sensitive flow rate sensor according to one of the prior arts.
Figure 17:
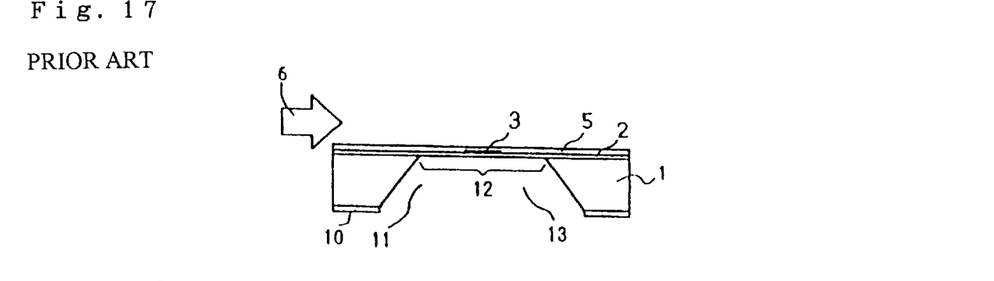
FIG. 17 is a sectional view showing the heat-sensitive flow rate sensor according to the prior art.

FIG. 16 is a plan view showing a flow rate-detecting element in the form of a diaphragm construction used in one of conventional heat-sensitive flow rate sensors. FIG. 17 is a sectional view taken along the line A—A in FIG. 16. In FIGS. 16 and 17, numeral 14 is a flow rate-detecting element. In this flow-rate detecting sensor 14, on the surface of a flat plate-like substrate 1 composed of silicon 0.4 mm thick, an insulating support film 2 composed of silicon nitride of 1 μm in thickness is deposited by spattering, CVD, or any other similar method. Further, on the support film 2, a heating element 3 composed of a heat-sensitive resistance film of platinum, etc. of 0.2 μm in thickness is deposited by evaporation, spattering, or any other similar method. On the heating element 3, patterns serving as current passage are formed by photomechanical process, wet or dry etching, or any other similar method. Further, a fluid-temperature detector 4 composed of a heat-sensitive resistance film of platinum, etc. of 0.2 μmin thickness is formed in the same method as mentioned. Furthermore, on both of the heating element 3 and fluid-temperature detector 4, an insulating protection film 5 composed of silicon nitride, etc. of 1 μm in thickness is deposited by spattering, CVD, or any other similar method. The heating element 3 is connected, through connecting sections 9a, 9b and lead sections 7a, 7d, to electrodes 8a, 8d for electric connection to outside. The fluid temperature-detector 4 is connected through lead sections 7b, 7c to electrodes 8b, 8c. The protection film 5 is removed from the portions of electrodes 8a to 8d to allow electric connection to outside by wire bonding or any other similar method. Further, after forming an etching hole 11 in a backside protection film 10 formed on the opposite face of the support film 2 of the flat plate-like base 1, a cavity 13 being a hollow part is formed by applying alkali etching or the like. Thus, a diaphragm 12 for detecting a flow rate is constructed. An arrow 6 indicates a flowing direction of a fluid to be measured.

Figure 18:
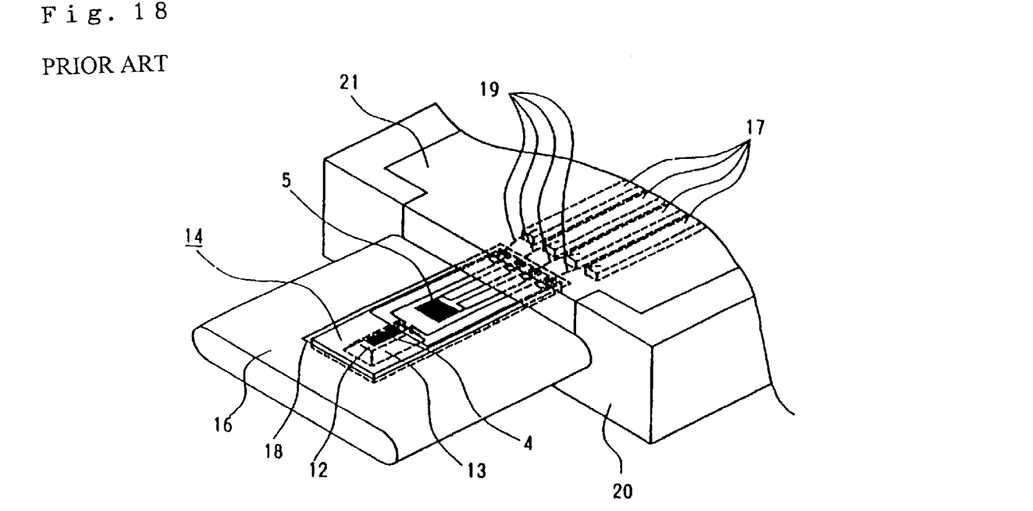
FIG. 18 is a perspective view showing the essential part of the conventional heat-sensitive flow rate sensor according to the prior art.

Furthermore, as described in the Japanese Patent Publication (unexamined) No. 142020/1998, in case that the flat plate-like flow rate-detecting element 14 of is placed into a fluid to be measured in almost parallel to or at a predetermined angle therefrom, the flow rate-detecting element 14 is placed on the accommodating portion of a supporting member 16, in order to prevent turbulence occurring in the vicinity of the cavity 13, peeling or the like occurring in the front edge portion of the flow rate-detecting element 14. As shown in FIG. 18, the supporting member 16 has a concave accommodating portion 18 to accommodate the flow rate-detecting element 14, and is electrically connected to a detection circuit board through terminals 17 arranged on a base member 20. In FIG. 18, numeral 19 is wires and numeral 21 is a cover. This type of flow rate-detecting element with a diaphragm construction is publicly known, as is also disclosed in the Japanese Patent Publication (unexamined) No. 2967/1992 and others.

Figure 19:
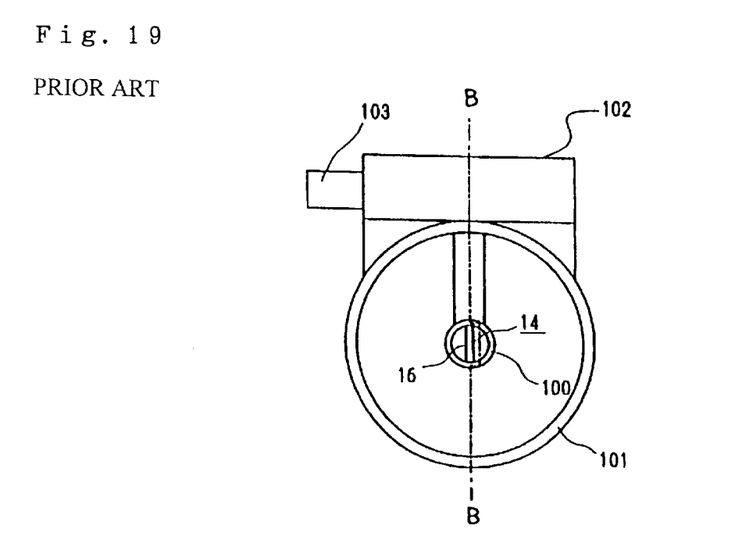
FIG. 19 is a front view showing the heat-sensitive flow rate sensor according to the prior art.
Figure 20:
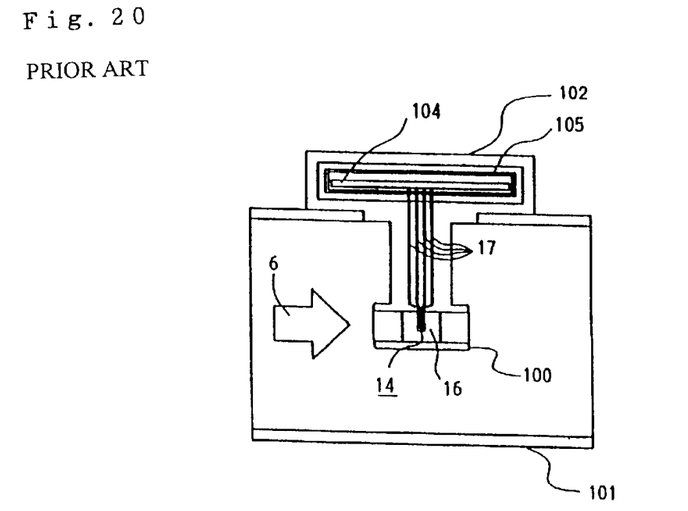
FIG. 20 is a transverse sectional view showing the heat-sensitive flow rate sensor according to the prior art.

FIG. 19 is a front view showing a structure of the heat-sensitive flow rate sensor according to the foregoing prior art, and FIG. 20 is a transverse sectional view taken along the B—B in FIG. 19. In this conventional heat-sensitive flow rate sensor, a detection pipe passage 100 is placed inside a main passage 101 for a fluid to be measured, and the flow rate-detecting element 14 mounted on the supporting member 16 is placed in the detection pipe passage 100. In FIGS. 19 and 20, numeral 102 is a case for accommodating a detection circuit board 104, numeral 103 is a connector, and numeral 105 is a shield member.

Figure 21:
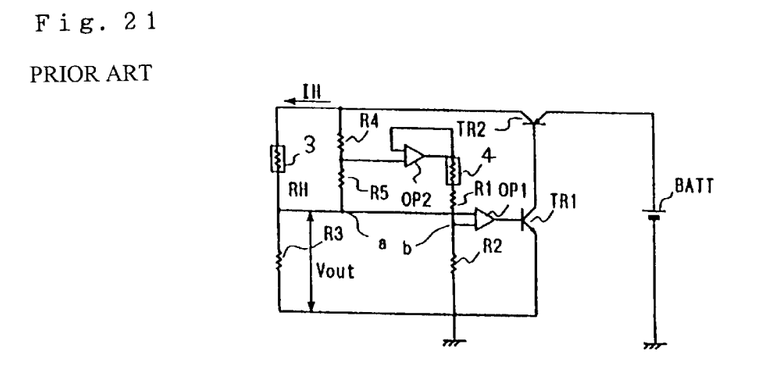
FIG. 21 is a detection circuit diagram of the conventional heat-sensitive flow rate sensor according to the prior art.

FIG. 21 shows a detection circuit of such conventional heat-sensitive flow rate sensor. The detection circuit board 104 is arranged into a generally used fixed-temperature difference control, and the detection circuit has a bridge circuit including the heating element 3 and the fluid-temperature detector 4. In FIG. 21, R1 to R5 are fixed resistance, OP1 and OP2 are operational amplifiers, TR1 and TR2 are transistors, and BATT is a power supply. The detection circuit, except the heating element 3 and the fluid-temperature detector 4, is arranged on the detection circuit board 4. The detection circuit is driven so as to keep point (a) and point (b) in FIG. 21 at almost the same potential, and controls a heating current IH of the heating element 3. When increasing the velocity of a fluid to be measured, amount of heat transferred from the heating element 3 to the fluid to be measured increases thereby the heating current IH supplied to the heating element 3 being increased. Velocity and flow rate of the fluid to be measured can be obtained by detecting the heating current IH as a voltage Vout at both ends of R3, and such information can be transferred through the connector 103 in FIG. 19 to ECU (electronic control unit).

Figure 22:
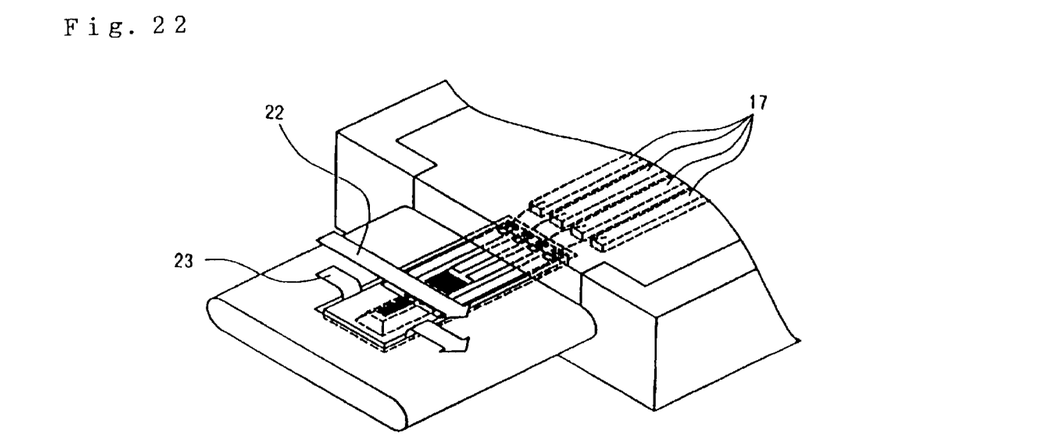
FIG. 22 is a perspective view showing essential parts to explain an underflow of the heat-sensitive flow rate sensor according to the prior art.
Figure 23:
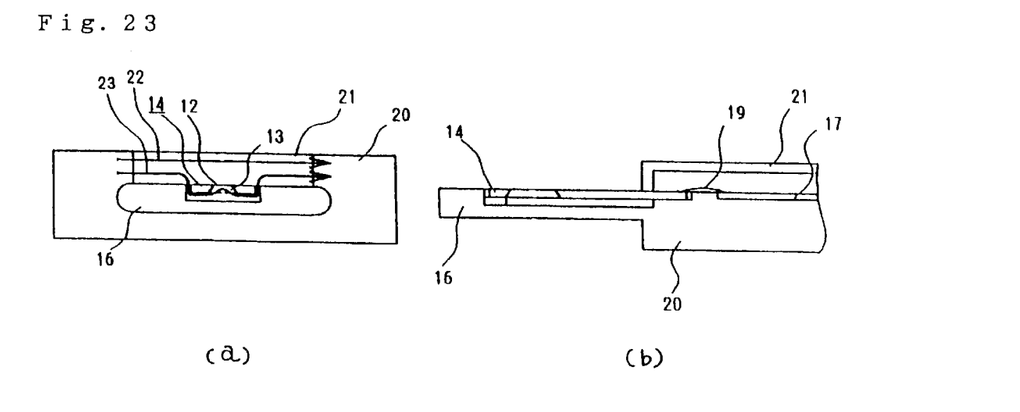

In the conventional heat-sensitive flow rate sensor of above construction, when mounting the flow rate-detecting element 14 on the accommodating portion 18 in the supporting member 16, the fluid to be measured flows passing through only the surface of the flow rate-detecting element 14 in a small flow rate region. On the other hand, however, in a large flow rate region, a certain amount of the fluid to be measured flows into a gap between the flow rate-detecting element 14 and the accommodating portion 18 in the supporting member 16. Such a flow into the gap is hereinafter referred to as underflow.) Hence, a disadvantage exists in that accuracy in flow rate detection is lowered. FIGS. 22 and 23 show the underflow. In FIGS. 22 and 23, numeral 22 indicates a flow of a fluid to be measured, and numeral 23 indicates a flow of an underflow. To cope with the mentioned disadvantage, for example, the Japanese Patent Publication (unexamined) No. 26343/1997 discloses a structure in which groove-like slots are provided in the accommodating portion of an supporting member along the peripheral edge of a flow rate-detecting element, in order to prevent the underflow produced in the large flow rate region from contacting directly the flow rate-detecting element. Such a structure, however, can not sufficiently prevent the underflow, because the underflow guided by the slots sometimes flows round into the gap formed by the cavity. Furthermore, the Japanese Patent Publication (unexamined) No. 2573/2000 discloses a structure in which one side, either upstream or downstream side, of a flow rate-detecting element is brought into close contact with one side of the accommodating portion in a supporting member in order to prevent the underflow. It is, however, very difficult to bring the side of a flow rate-detecting element into close contact with the side of the accommodating portion. This is because at the time of fixing the flow rate-detecting element to the bottom face of the accommodating portion using some adhesive, the heating element moves slightly as the adhesive is dried. A further problem exists in that it is essential to of connecting the side of the flow rate-detecting element to strictly control dimensional accuracy, surface roughness, etc. of the sides of the accommodating portion and the flow rate-detecting element, which eventually results in low productivity.

SUMMARY OF THE INVENTION

The present invention was made to solve the above-discussed problems and has an object of providing a heat-sensitive flow rate sensor that is high in productivity, superior in accuracy of flow rate measurement and sensitivity.

A heat-sensitive flow rate sensor according to the invention comprises: a flow rate-detecting element having a heating element of a heat-sensitive resistance film formed on a surface of a flat plate-like base, and a diaphragm provided with a hollow part at a lower part of the heating element and formed by removing partially a flat plate-like base; and a supporting member having a concave accommodating portion for mounting the flow rate-detecting element thereon and placed inside a pipeline through which a fluid to be measured flows; wherein a protruding face is provided in a raised manner on the bottom face of the accommodating portion of the supporting member so as to block the hollow part on the underside of the flow rate-detecting element.

As a result of such construction, the fluid to be measured can be prevented from flowing into the hollow part, and accuracy in flow rate measurement is improved.

It is preferable that the protruding face blocks entirely the hollow part.

It is also preferable that the protruding face blocks a part of the hollow part while leaving the remaining part open.

As a result of such construction, the fluid to be measured can be restrained from flowing into the hollow part, and the diaphragm can also be prevented from deformation due to expansion or contraction of the fluid to be measured that is enclosed in the hollow part. Thus, accuracy in flow rate measurement is improved.

It is also preferable that the protruding face blocks a part of the hollow part corresponding to a lower part of a pattern of the heating element.

As a result of such construction, amount of heat transferred from the flow rate-detecting element to the supporting member can be restrained, and the fluid to be measured can also be restrained from flowing into the hollow part. Consequently, sensitivity and accuracy in flow rate measurement of the flow rate sensor can be improved.

Another heat-sensitive flow rate sensor according to the invention comprises: a flow rate-detecting element having a heating element of a heat-sensitive resistance film formed on a surface of a flat plate-like base, and a diaphragm formed with a hollow part at a lower part of the heating element and made by removing partially a flat plate-like base; and a supporting member having a concave accommodating portion for mounting the flow rate-detecting element thereon and placed inside a pipeline through which a fluid to be measured flows; wherein a protruding face is provided in a raised manner on the bottom face of the accommodating portion of the supporting member so as to cover a peripheral edge of the hollow part on the underside of the flow rate-detecting element, and the mentioned protruding face has an inclination formed more outside than the external circumference of the hollow part.

As a result of such construction, amount of heat transferred from the flow rate-detecting element to the supporting member can be restrained, and the fluid to be measured can also be restrained from flowing into the hollow part. Thus, sensitivity and accuracy in flow rate measurement of the flow rate sensor can be improved.

BRIEF DESCRIPTION OF THE DRAWINGS

FIGS. 2(a) and (b) are sectional views respectively showing the heat-sensitive flow rate sensor according to Embodiment 1 of the invention.

FIGS. 3(a) and (b) are sectional views respectively showing the heat-sensitive flow rate sensor according to Embodiment 1 of the invention.

FIGS. 4(a) and (b) are sectional views respectively owing the heat-sensitive flow rate sensor according to Embodiment 1 of the invention.

FIGS. 6(a) and (b) are sectional views respectively showing the heat-sensitive flow rate sensor according to Embodiment 2 of the invention.

FIGS. 7(a) and (b) are sectional views respectively showing the heat-sensitive flow rate sensor according to Embodiment 2 of the invention.

FIGS. 8(a) and (b) are sectional views respectively showing the heat-sensitive flow rate sensor according to Embodiment 2 of the invention.

FIGS. 9(a) and (b) are sectional views respectively showing the heat-sensitive flow rate sensor according to Embodiment 2 of the invention.

FIGS. 12(a) and (b) are sectional views respectively showing the heat-sensitive flow rate sensor according to Embodiment 3 of the invention.

FIGS. 13(a) and (b) are sectional views respectively showing the heat-sensitive flow rate sensor according to Embodiment 3 of the invention.

FIGS. 14(a) and (b) are sectional views respectively showing the heat-sensitive flow rate sensor according to Embodiment 3 of the invention.

FIGS. 23(a) and (b) are sectional views respectively to explain the underflow of the heat-sensitive flow rate sensor according to the prior art.

DESCRIPTION OF THE PREFERRED EMBODIMENTS

Embodiment 1

Figure 1:
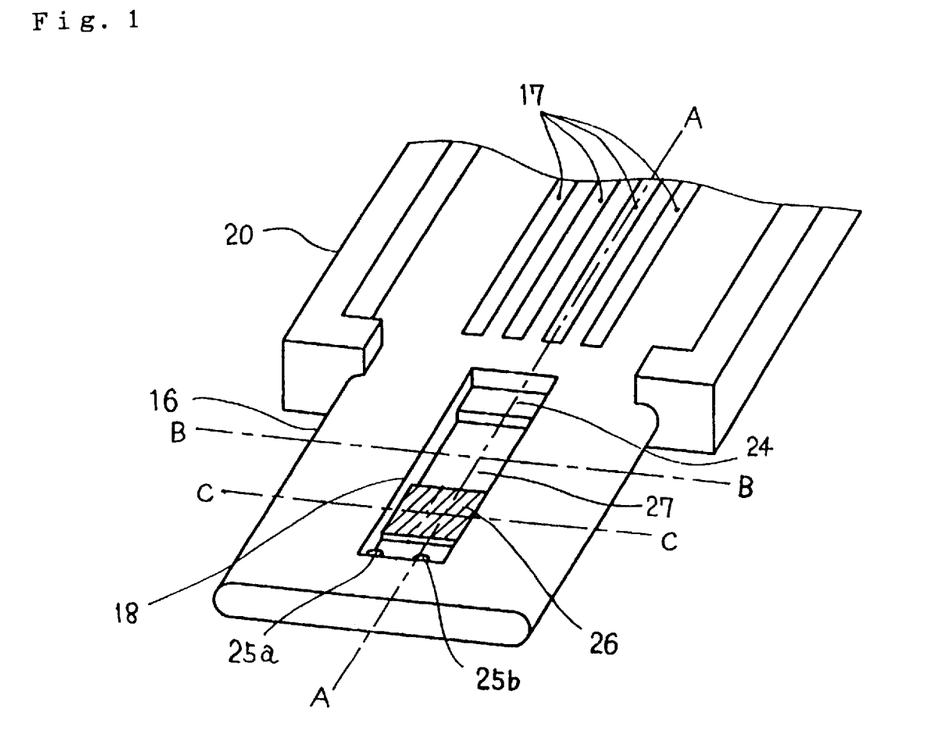
FIG. 1 is a perspective view showing an essential part of a heat-sensitive flow rate sensor according to Embodiment 1 of the present invention.
Figure 2:
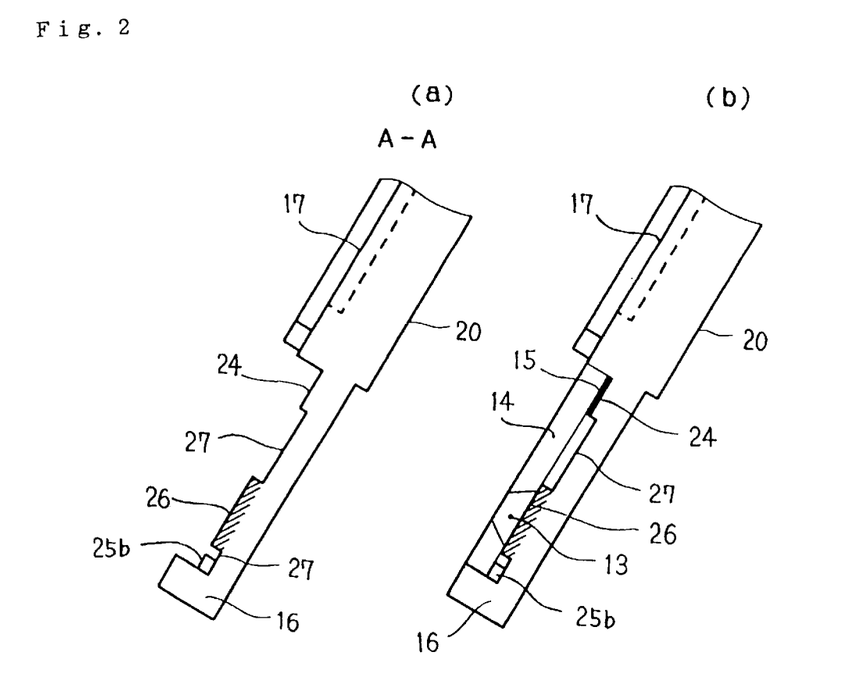
Figure 3:
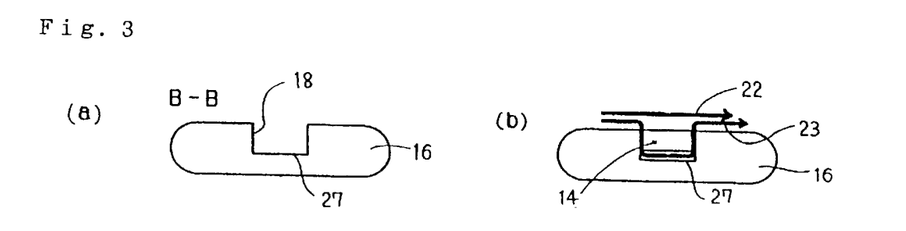
Figure 4:
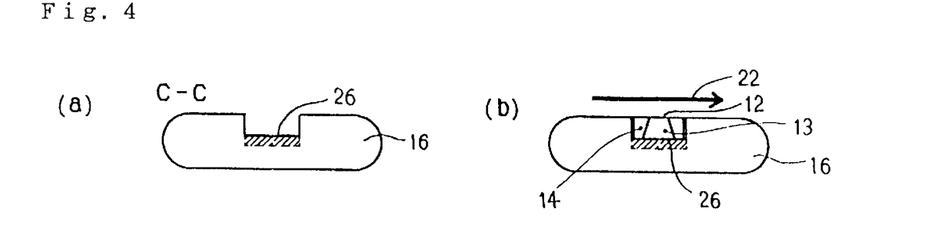

The present invention is hereinafter described in more detail with reference to the accompanying drawings. FIG. 1 is a perspective view showing essential parts of a supporting member of a heat-sensitive flow rate sensor according to Embodiment 1 of the invention. FIGS. 2(a) and (b) are sectional views taken along the line A—A in FIG. 1. FIGS. 3(a) and (b) are sectional views taken along the line B—B in FIG. 1. FIGS. 4(a) and (b) are sectional views taken along the line C—C in FIG. 1. Each (a) of FIGS. 2 to 4 shows only a supporting member and each (b) of FIGS. 2 to 4 shows the supporting member on which a flow rate-detecting element is mounted. In the drawings, reference numeral 14 is a flow rate-detecting element that is the same one as in the prior art (see FIG. 16). In this flow rate-detecting element 14, on the surface of a flat plate-like base 1, a heating element 3 made of a heat-sensitive resistance film is formed. At the lower part of the heating element 3, a diaphragm 12 for detecting a flow rate is placed by forming a cavity 13, or a hollow part, made by removing a part of the flat plate-like substrate 1. Numeral 16 shows a supporting member according to Embodiment 1. The supporting member 16 has, in the same manner as is in the prior art, terminals 17 and a concave accommodating portion 18 for mounting the flow rate-detecting element 14 thereon. Further, after being attached to a base member 20, the supporting member 16 is placed inside a pipeline through which a fluid to be measured passes. In addition, the flow rate-detecting element 14 is fastened to the supporting member 16 with an adhesive 15.

In this Embodiment 1, on the bottom face of the accommodating portion 18 of the supporting member, a protruded protruding face 26 is provided in a raised manner to block the whole area of the cavity 13 on the underside of the flow rate-detecting element 14.

Structure of the accommodating portion 18 of the supporting member 16 in this Embodiment 1 is hereinafter described with reference to FIGS. 1 and 2. The bottom face of the concave accommodating portion 18 is provided with an adhesion face 24 for fastening the flow rate-detecting element 14 thereon with the adhesive 15, installation faces 25a and 25b for holding the flow rate-detecting element 14 thereon, and a protruding face 26 provided in a raised manner for blocking the whole area of the cavity 13 on the underside of the flow rate-detecting element 14. The adhesion face 24 is formed lower than the installation faces 25a and 25b only by the thickness of the adhesive 15 so that the flow rate-detecting element 14 is mounted after the adhesive 15 is applied to the adhesion face 24. Thus, the flow rate-detecting element 14 is installed or placed on almost the same plane as the surface of the supporting member 16. The protruding face 26 is formed slightly larger than the area of the cavity 13 of the flow rate-detecting element 14 so as to block the whole area of the cavity 13. Except the portions in contact with the adhesion face 24, the installation faces 25a, 25b, and the protruding face 26, a space is formed between the underside of the flow rate-detecting element 14 and the bottom face 27. As a result, the flow rate-detecting element 14 is prevented from being in contact with the supporting member 16.

A flow of a fluid to be measured through the heat-sensitive flow rate sensor of the above construction is hereinafter described with reference to FIGS. 3 and 4. In FIGS. 3 and 4, reference numeral 22 is a flow of the fluid to be measured and numeral 23 is an underflow flowing into the gap between the underside of the flow rate-detecting element 14 and the accommodating portion 18 of the supporting member 16. In the heat-sensitive flow rate sensor of this Embodiment 1, when increasing an intake fluid to a large amount of flow, an underflow is produced in the space between the bottom face 27 of the supporting member 16 and the underside of the flow rate-detecting element 14 (see FIG. 3 (b)). However, underflow is not produced in the vicinity of the cavity 13 that is blocked by the protruding face 26 (see FIG. 4(b)). Accordingly, the accuracy in flow rate measurement is improved. Furthermore, in this Embodiment 1, the protruding face 26 is formed to have a larger area than that of the cavity 13 of the flow rate-detecting element 14. Therefore, an advantage of preventing a bottom flow can be satisfactorily exhibited, without strictly controlling a positioning relation between the side of the accommodating portion 18 and the side of the flow rate-detecting element 14 as is done in the prior art such as the Japanese Patent Publication (unexamined) No. 2573/2000. As a result, assembling the flow rate-detecting element 14 becomes easier, which is suitable for large-scale production.

Embodiment 2

Figure 5:
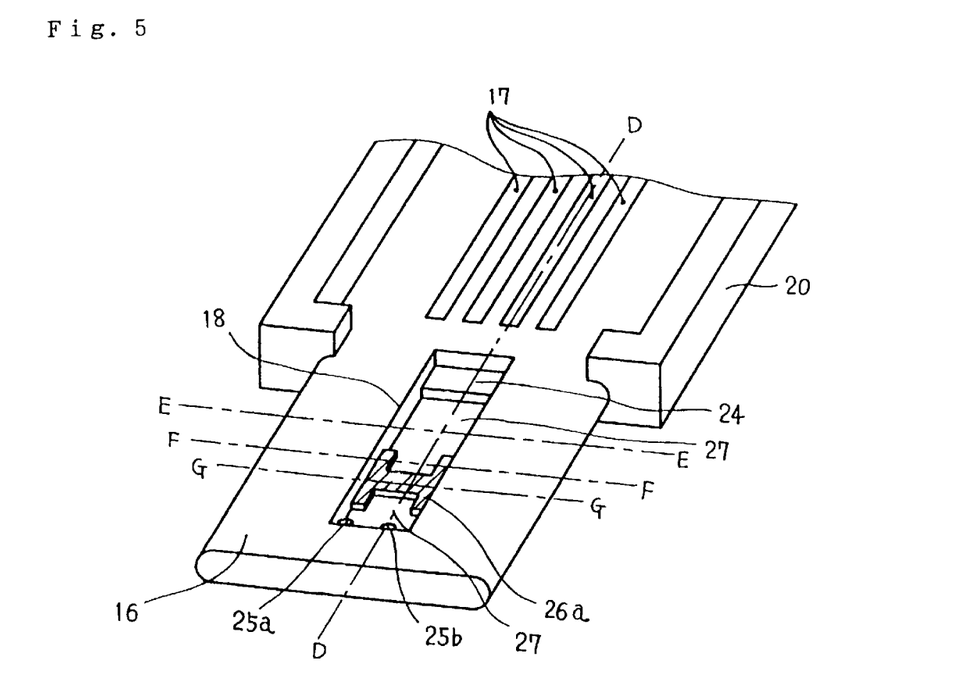
FIG. 5 is a perspective view showing essential parts of a heat-sensitive flow rate sensor according to Embodiment 2 of the invention.
Figure 6:
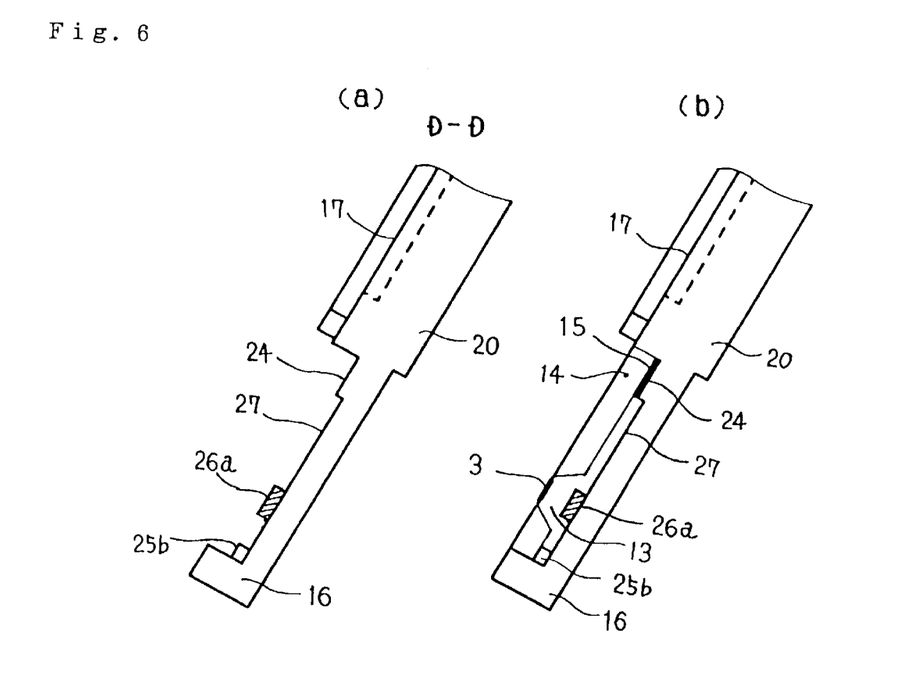
Figure 7:
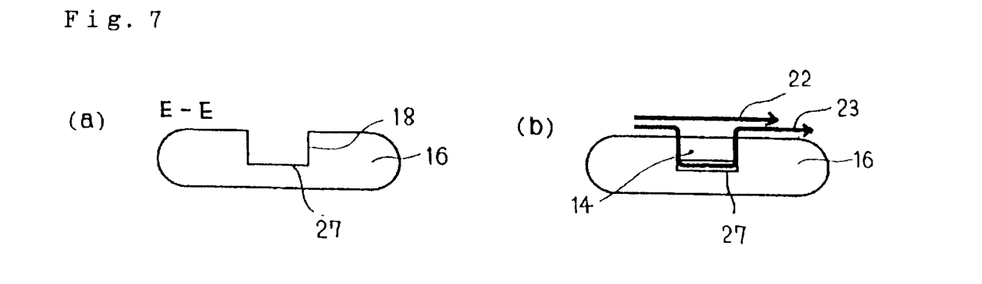
Figure 8:
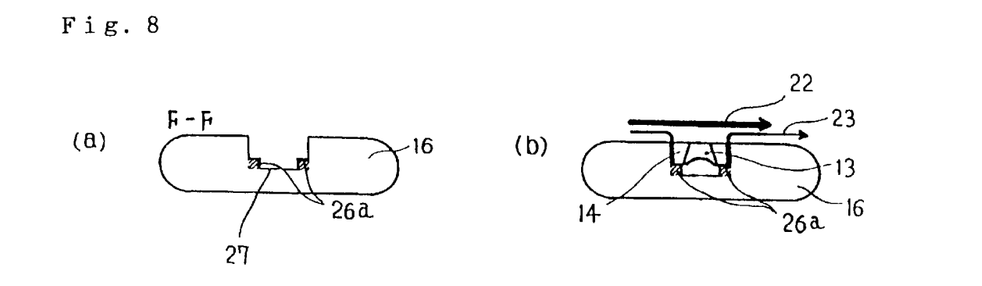
Figure 9:
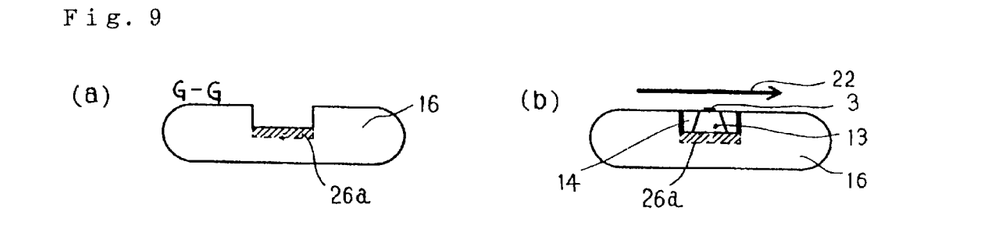

FIG. 5 is a perspective view showing an essential part of a supporting member of a heat-sensitive flow rate sensor according to Embodiment 2 of the invention. FIGS. 6(a) and (b) are sectional views taken along the line D—D in FIG. 5. FIGS. 7(a) and (b) are sectional views taken along the line E—E in FIG. 5. FIGS. 8(a) and (b) are sectional views taken along the line F—F in FIG. 5. FIGS. 9(a) and (b) are sectional views taken along the line G—G in FIG. 5. Each (a) of FIGS. 6 to 9 shows only a supporting member and each (b) of FIGS. 6 to 9 shows the supporting member on which a flow rate-detecting element is mounted. In the drawings, numeral 26a is a protruding face provided on the bottom face of the accommodating portion 18 of the supporting member 16, and the protruding face 26a blocks a part of a cavity 13 on the underside of the flow rate-detecting element 14, leaving the other part open. Numeral 3 is a heating element made of a heat-sensitive resistance film, and numeral 12 is a diaphragm for detecting a flow rate. Note that in the drawings, the same or like parts are designated by the same reference numerals, and further description thereof is omitted herein.

In this Embodiment 2, the protruding face 26a is formed on the bottom face of the accommodating portion 18 of the supporting member 16 to block a part of the cavity 13 corresponding to the lower part of the pattern of the heating element 3. In this manner, it is possible to achieve a structure in which contact portion between the flow rate-detecting element 14 and the supporting member 16 is smaller than in the foregoing Embodiment 1.

The flow rate sensor becomes more sensitive as more amount of heat is taken away by the fluid to be measured out of the total Joule heat generated in the heating element 3. In other words, the sensitivity is more improved as less amount of heat is transferred from the flow rate-detecting element 14 to the supporting member 16. In the foregoing Embodiment 1, it is certain that an underflow can be prevented without fail by forming the protruding face 26 to block the whole area of the cavity 13 of the flow rate-detecting element 14. But, heat loss caused by the heat transfer from the flow rate-detecting element 14 to the supporting member 16 is so large that the sensitivity of the flow rate sensor is liable to lower. From this viewpoint, in this Embodiment 2, the protruding face 26*a* is formed to block a part of the cavity 13 corresponding to the lower part of the heating element 3 of the flow rate-detecting element 14. As a result, amount of the heat transferred from the flow rate-detecting element 14 to the supporting member 16 is restrained and the sensitivity of the flow rate sensor is prevented from deterioration.

Further, as shown FIGS. 7 to 9, in the structure of the supporting member 16 according to this Embodiment 2, difference in air-flow resistance occurs in the passage along the underside of the flow rate-detecting element 14. Because a fluid flows more into the area of smaller air-flow resistance, the fluid in the structure flows in passages other than that corresponding to the lower part of the cavity 13 of the heating element 3. More specifically, when an underflow is produced due to increase in intake fluid (see FIG. 7(*b*)), the portion of the cavity 13 is restrained from the underflow 23 flowing in because of the narrow inlet passage (see FIG. 8(*b*)). Furthermore, since there is no passage for underflow (see FIG. 9(*b*)) in the portion corresponding to the lower part of the heating element 3 of the cavity 13, the underflow 23 hardly flows therein. As a result, there is almost no influence of the underflow in the vicinity of the heating element 3 of the flow rate element 14, and accuracy in flow rate measurement is hardly lowered.

Figure 10:
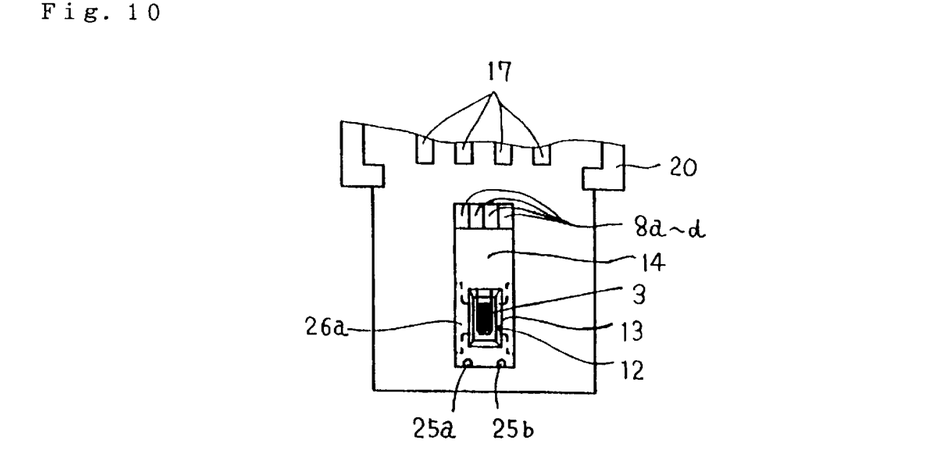
FIG. 10 is a plan view showing essential parts of the heat-sensitive flow rate sensor according to Embodiment 2 of the invention.

Furthermore, in the foregoing Embodiment 1, since the protruding face is formed so as to block the whole area of the cavity 13, there is a possibility that the fluid enclosed in the cavity 13 expands or contracts due to extreme rise or fall in atmospheric temperature. Consequently the diaphragm for the flow rate-detecting element may be deformed. On the other hand, in this Embodiment 2, as shown in FIG. 10, the protruding face is constructed while leaving the cavity 13 partially open, and consequently the diaphragm 12 for detecting a flow rate is free from the deformation. As a result, stable detection of flow rate can be performed.

Embodiment 3

Figure 11:
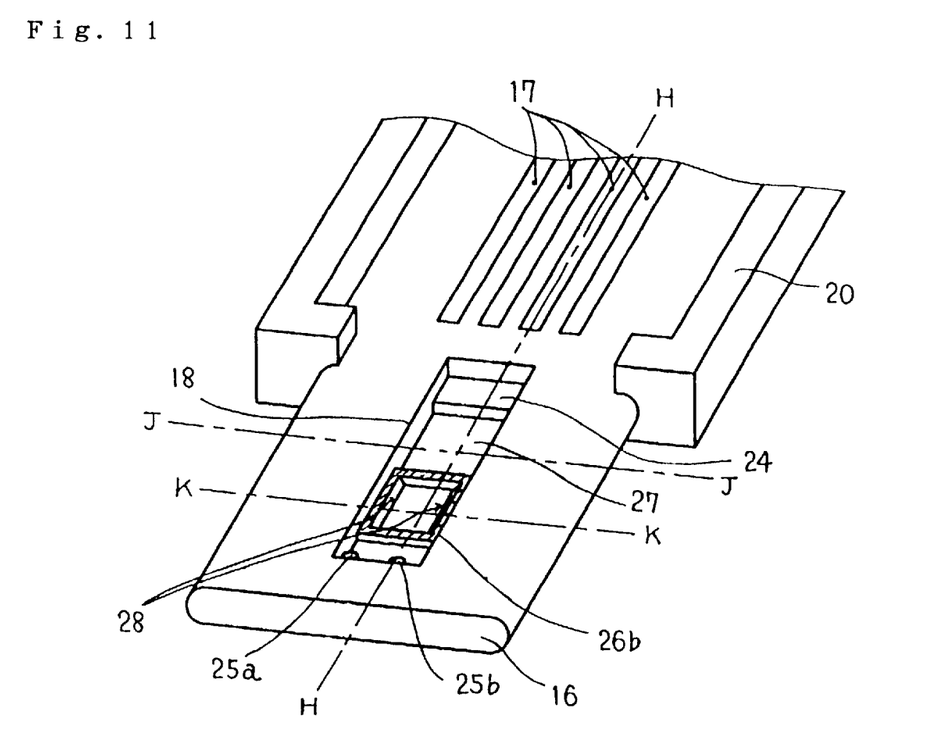
FIG. 11 is a sectional view showing essential parts of a heat-sensitive flow rate sensor according to Embodiment 3 of the invention.
Figure 12:
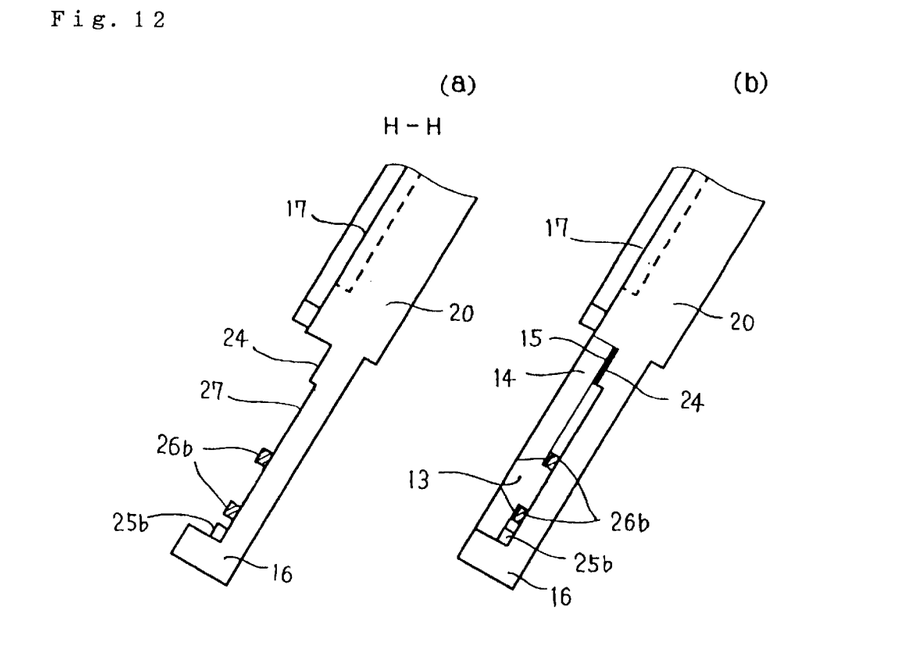
Figure 13:
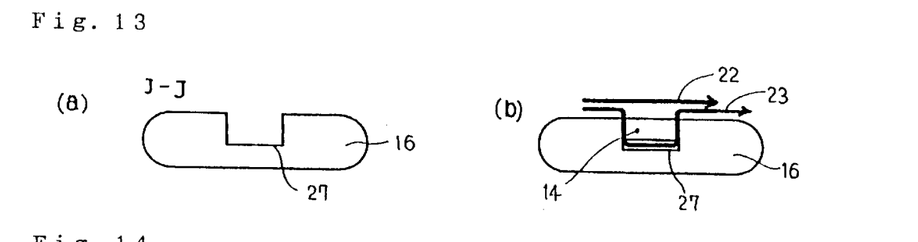
Figure 14:
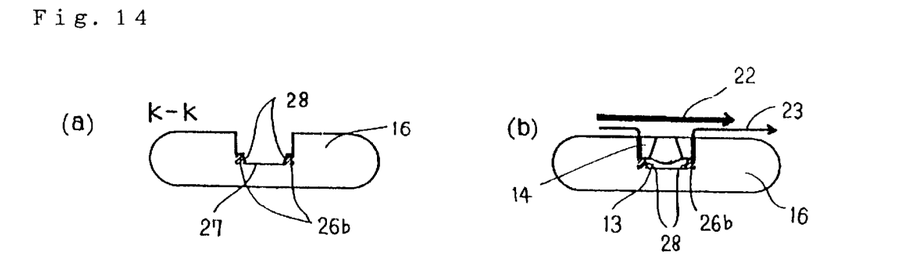
Figure 15:
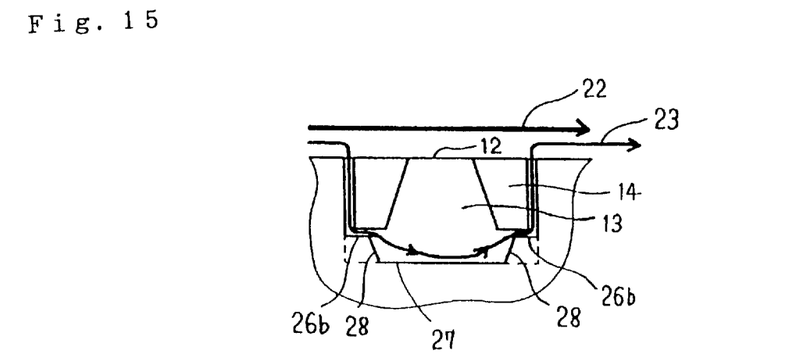
FIG. 15 is an enlarged sectional view showing an essential part of the heat-sensitive flow rate sensor according to Embodiment 3 of the invention.

FIG. 11 is a perspective view showing an essential part of a supporting member of a heat-sensitive flow rate sensor according to Embodiment 3 of the invention. FIGS. 12 (*a*) and (*b*) are sectional views taken along the line H—H in FIG. 11. FIGS. 13 (*a*) and (*b*) are sectional views taken along the line J—J in FIG. 11. FIGS. 14 (*a*) and (*b*) are sectional views taken along the line K—K in FIG. 11. Each (a) of FIGS. 12 to 14 shows only a supporting member and each (b) of FIGS. 12 to 14 shows the supporting member on which a flow rate-detecting element is mounted. Furthermore, FIG. 15 is an enlarged sectional view of an essential part in the vicinity of the cavity 13 of the flow rate-detecting element. In the drawings, numeral 26*b* is a protruding face formed on the bottom face of the accommodating portion 18 of the supporting member 16. This protruding face 26*b* is formed in a raised manner so as to cover the peripheral edge of the cavity 13 on the underside of the flow rate-detecting element 14, and has an inclined side 28 formed more outside than the outer circumference of the cavity 13. In the drawings, the same or like parts are designated by the same reference numerals, and further description thereof is omitted herein.

As described in the foregoing Embodiment 2, for the purpose of improving the sensitivity of the flow rate sensor, it is required to restrain the amount of the heat transferred from the flow rate-detecting element 14 to the supporting member 16. Therefore, it is preferable for the sensor to have a contact area as small as possible between the flow rate-detecting element 14 and the supporting member 16. Nevertheless, in the conventional flow rate sensor, there has been a problem that an underflow in the vicinity of the cavity 13 comes to flow in the direction of the diaphragm 12 for detecting a flow rate (see FIG. 23), and this sometimes generates swirling eddies inside the cavity 13. As a result, accuracy in flow rate measurement is negatively affected. On the other hand, in this Embodiment 3, the protruding face 26*b* covering the peripheral edge of the cavity 13 is so formed as to be slightly lower than installation faces 25*a*, 25*b* and to have an inclined side 28 formed more outside than the outer circumference of the cavity 13. In such a structure, it is certain that an underflow is produced due to the gap formed between the bottom face 27 or the protruding face 26*a* and the underside of the flow rate-detecting element 14 (see FIGS. 14(*b*) and 15). But the vector of the underflow is directed toward the bottom face 27 of the accommodating portion 18 due to the inclined side 28 provided in the protruding face 26*b* (see FIGS. 14(*b*) and 15). Therefore, influence of the underflow in the periphery of the diaphragm 12 for detecting a flow rate can be significantly restrained. As a result, the sensitivity of the flow rate sensor is improved and accuracy in flow rate measurement can be assured.

What is claimed is:

1. A heat-sensitive flow rate sensor comprising:
    a flow rate-detecting element having a heating element of a heat-sensitive resistance film formed on a surface of a flat plate-like base, and a diaphragm provided with a hollow part at a lower part of said heating element and formed by removing partially a flat plate-like base; and
    a supporting member having a concave accommodating portion for mounting said flow rate-detecting element thereon and placed inside a pipeline through which a fluid to be measured flows, said concave accommodating portion having a bottom face with a protruding face provided in a raised manner so as to contact an underside of said flow rate-detecting element in order to block a fluid flow across said hollow part of said flow rate-detecting element.

2. The heat-sensitive flow rate sensor according to claim 1, wherein the protruding face blocks entirely the hollow part.

3. The heat-sensitive flow rate sensor according to claim 1, wherein the protruding face blocks a part of the hollow part while leaving the remaining part open.

4. The heat-sensitive flow rate sensor according to claim 3, wherein the protruding face blocks a part of the hollow part corresponding to a lower part of a pattern of the heating element.

5. A heat-sensitive flow rate sensor comprising:
    a flow rate-detecting element having a heating element of a heat-sensitive resistance film formed on a surface of a flat plate-like base, and a diaphragm provided with a hollow part at a lower part of said heating element and formed by removing partially a flat plate-like base; and
    a supporting member having a concave accommodating portion for mounting said flow rate-detecting element thereon and placed inside a pipeline through which a fluid to be measured flows;

wherein a protruding face is provided in a raised manner on the bottom face of said accommodating portion of said supporting member so as to cover a peripheral edge of said hollow part on the underside of said flow rate-detecting element, and said protruding face has an inclination formed more outside than the external circumference of said hollow part.

6. The heat-sensitive flow rate sensor according to claim 1, further comprising an adhesion face formed on the bottom face of the concave accommodating portion, wherein the adhesion face is formed separately from the protruding face and wherein the flow rate-detecting element is mounted on the adhesive face with adhesive.

7. A heat-sensitive flow rate sensor comprising:

a flow rate-detecting element having a heating element of a heat-sensitive resistance film formed on a surface of a flat plate-like base, and a diaphragm provided with a hollow part at a lower part of said heating element and formed by removing partially a flat plate-like base; and a supporting member having a concave accommodating portion for mounting said flow rate-detecting element thereon and placed inside a pipeline through which a fluid to be measured flows, said concave accommodating portion having a bottom face with a protruding face provided in a raised manner on the bottom face of the accommodating portion of said supporting member so as to block said hollow part on the underside of said flow rate-detecting element, wherein the protruding face blocks a part of the hollow part while leaving the remaining part open and wherein the protruding face blocks a part of the hollow part corresponding to a lower part of a pattern of the heating element.

* * * * *